United States Patent [19]

Falco et al.

[11] Patent Number: 4,846,547

[45] Date of Patent: Jul. 11, 1989

[54] MICROBEND FIBER-OPTIC SENSOR

[75] Inventors: Lucien G. Falco, Cressier; Olivier M. Parriaux, Lausanne, both of, Switzerland

[73] Assignee: Centre Suisse D'Electronique Et De Microtechnique S.A., Neuchatel, Switzerland

[21] Appl. No.: 22,403

[22] Filed: Mar. 6, 1987

[51] Int. Cl.⁴ ............................ G02B 6/02; G02B 6/16
[52] U.S. Cl. ................................................. 350/96.29
[58] Field of Search ............... 350/96.15, 96.29, 96.33; 250/227

[56] References Cited

U.S. PATENT DOCUMENTS

| 3,891,302 | 6/1975 | Dabby et al. | 350/96.19 |
| 4,179,187 | 12/1979 | Maurer | 350/96.33 X |
| 4,372,646 | 2/1983 | Strahan et al. | 350/96.33 X |
| 4,372,647 | 2/1983 | Okamoto et al. | 350/96.33 |
| 4,443,700 | 4/1984 | Macedo et al. | 250/227 |
| 4,634,856 | 1/1987 | Kirkham | 250/227 |
| 4,654,520 | 3/1987 | Griffiths | 350/96.29 X |
| 4,701,614 | 10/1987 | Jaeger et al. | 350/96.29 X |
| 4,795,232 | 1/1989 | Persson | 350/96.29 X |

Primary Examiner—William L. Sikes
Assistant Examiner—Phan T. Heartney
Attorney, Agent, or Firm—Arnold, White & Durkee

[57] ABSTRACT

The invention relates to a fiber-optic detector and concerns more particularly a detector capable of producing microbends in an optical fiber in response to the variation of a physical quantity or of an environmental parameter. The sensor of the invention consists of an optical fiber provide with a sheath which is covered by a layer exhibiting periodic discontinuities. The sheath and its covering react to the variation of the parameter to be detected in such a manner as to produce microbends of the same periodicity as that of the discontinuities.

23 Claims, 2 Drawing Sheets

MICROBEND FIBER-OPTIC SENSOR

FIELD OF THE INVENTION

The present invention relates, in a general way, to fiber-optic sensors and, more particularly, to sensors which utilize the effect of microbends of a fiber to detect a physical quantity or an environmental parameter.

DESCRIPTION OF THE PRIOR ART

The technique of detection by optical fibers offers, in comparison with current techniques, a large number of advantages, among which the following may be mentioned: compatibility with optical communication systems, insensitivity to external electromagnetic phenomena and, in a general way, the capability of operating in a harsh environment. Among the various fiber-optic detectors, there is a category of detectors which modulates the intensity of the light transmitted by a fiber in response to a variation of the quantity to be measured. This modulation of intensity is, in fact, reflected in a variation of the attenuation of the fiber. A particular type of detector falling within the latter category is the microbend detector, in which the attenuation of the fiber is caused by a local undulation of the angle of curvature of the fiber. Swiss Patent CH627,573 describes a device sensitive to the pressure of the weight of a body, which pressure is exerted on an optical fiber provided with a sheath, the internal surface of which is rough. An article by M. B. J. Diemeer and P. F. Trommel, "Fiber-optic microbend sensor" which appeared in Optics Letters, Vol. 9, No. 6 of June 1984 and an article of A. R. Mickelson et al, entitled "Backscatter readout from serial microbending sensors", which appeared in Journal of Lightwave Technology, Vol. LT-2, No. 5, of October 1984, show examples of force sensors making use of ribbed plates, or jaws, in order to generate microbends on a fibre disposed between these jaws when a force is applied to the said jaws. In the examples mentioned herein above, the sensors either require external components, such as the jaws, or require a difficult production process which lacks compatibility with the industrial requirements. Furthermore, these sensors are principally intended to detect the application of a force and, a priori, lack suitability to detect other quantities such as an environmental parameter.

SUMMARY OF THE INVENTION

Thus, an object of the invention is a fibre-optic sensor which is capable of producing microbends of the fibre and which does not exhibit the difficulties mentioned herein above.

A further object of the invention is a sensor capable of detecting a physical quantity.

A further aspect of the invention is a sensor capable of detecting an environmental parameter.

A further object of the invention is a sensor which does not require external components.

A further object of the invention is a sensor permitting serial production.

In the sensor according to this invention the fibre has a sheath of a first material and the sheath is provided with a layer of a second material which exhibits periodic discontinuities. The two materials have, for example, different coefficients of thermal expansion, different absorptions or different rigidities so that variations in temperature, humidity or force produce periodic microbends which lead to energy mode transfer.

BRIEF DESCRIPTION OF THE DRAWINGS

These and other features of the invention are described hereinafter, by way of example only, with reference to the accompanying drawings, in which.

DESCRIPTION OF THE PREFERRED EMBODIMENTS

Figure 1:
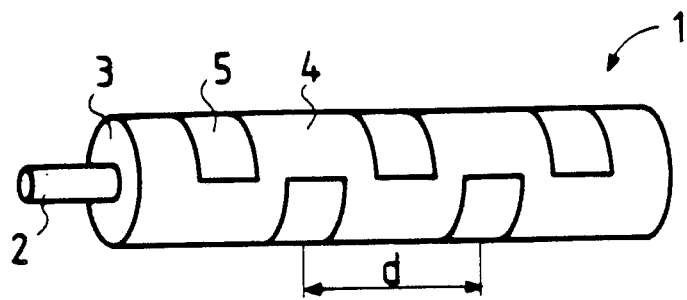
FIG. 1 shows a first exemplary embodiment of a sensor according to the invention.

FIG. 1 shows a partial view of a first embodiment of the sensor of the invention. This sensor is formed by an optical fiber 2 and its sheath 3. The sheath includes a covering 4 which exhibits discontinuities 5. These discontinuities 5 are such that they exhibit a periodicity "d" in a longitudinal direction and a circular asymmetry in a perpendicular plane. The optical fiber may be of a multimode, mono-mode or bimode type. In the case of a temperature sensor, the sheath may be formed by a synthetic material 3, such as nylon, covered with a metallic layer 4 of a few tens of micrometers, for example of copper or nickel. This metallic layer is, for example, obtained by chemical deposition. The discontinuities of the metallic layer may be formed by means of a chemical attack after deposition of a photosensitive resin and exposure through a suitable mask. The principle of operation of such a sensor is the following. Under the effect of a variation of temperature, the difference of the coefficients of expansion of the zones 4 and 5 of the external surface of the fiber gives rise to a deformation of the sheath and, consequently, of the fiber 2 in the form of an undulation (microbends) of periodicity equal to the periodicity "d" of the discontinuities. The periodicity "d" is linked to the propagation constant of the mode or modes guided by the fiber in such a manner that the attenuation (or the coupling between modes) caused by the microbends is a maximum.

The structure of the sensor of FIG. 1 may be advantageously exploited for the purpose of detecting variations other than a variation of the temperature. Thus, if the zones 4 and 5 of the sheath are formed in materials exhibiting differing absorption coefficients, for a given environmental parameter such as humidity, the sensor may be used as a humidity sensor. The same structure may likewise be used for the purpose of constructing an intrusion detector. In fact, since the zones 4 and 5 exhibit differing rigidities, a pressure exerted on the sheath by any body whatsoever will result in the induction of microbends at the location of the sensor.

Figure 2:
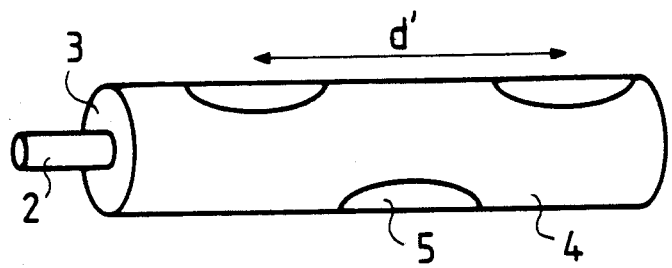
FIG. 2 shows a second exemplary embodiment of a sensor according to the invention.

FIG. 2 shows a modified embodiment of the sensor of the invention. It should be noted that the shape of the zones 5 may be dependent upon the technology employed, chemical attack or mechanical attack, and/or upon the application contemplated.

Figure 4:
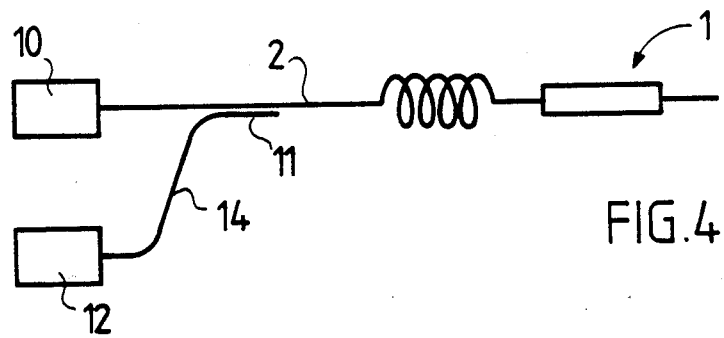
FIG. 4 shows a first detecting system incorporating a sensor of the invention.

FIG. 4 shows a first detection system incorporating the sensor of the invention. Such a system, referred to as OTDR ("Optical Time Domain Reflectometry") comprises a source of light modulated by pulses 10, an optical fiber 2, a sensor 1, a coupler 11 and a detection circuit 12. The fiber 2 may be of a multi-mode type or of the monomode type. The sensor 1 is provided on the fiber 2. It is likewise possible to have a plurality of sensors distributed, in a discrete manner, over the entire length of the fiber, or even to provide the sensor over the entire length of the fiber. When microbends are produced at the location of the sensor 1, a part of the light originating from the source 10 is returned towards the source ("backscattering" effect) and is applied to the detection circuit 12 via the coupler 11 and the optical fiber 14.

Figure 3:
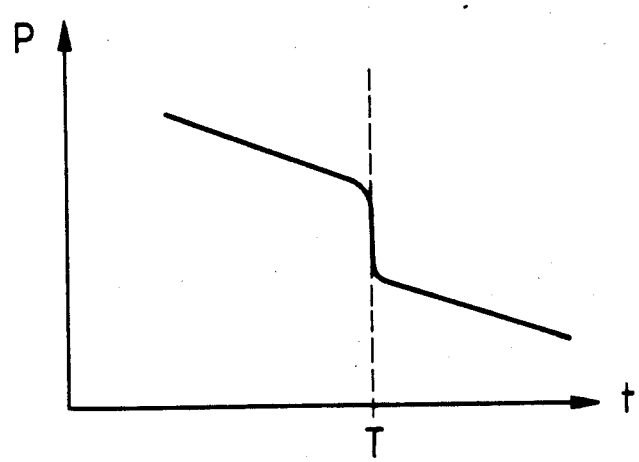
FIG. 3 is a graph illustrating the response of the sensor to an activating signal.

As illustrated in FIG. 3, which shows, as a function of the time t, the development of the power p of the signal received following a disturbance at the location of the sensor, it is possible to detect the disturbance. Likewise, it is readily seen that, knowing the response of the sensor to the selected environmental parameter and the velocity of propagation of the signal in the fiber 2, it is likewise possible to measure the variation of this parameter and the localization of the disturbance.

Figure 5:
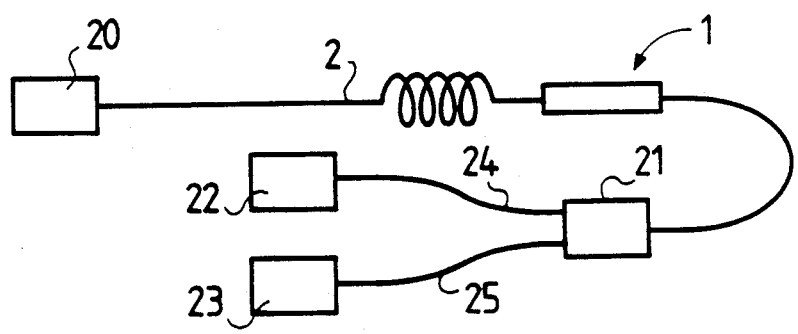
FIG. 5 shows a second detection system incorporating a sensor of the invention.

In the above examples, use has been made of the fact that the microbends induced at the location of the sensor by the variation of an environmental parameter gave rise to a transfer of energy from modes guided by the fiber to modes radiated outside the fiber. On an overall basis, such a phenomenon is reflected in a loss of the energy transmitted by the fiber. Nevertheless, it is possible to utilize another characteristic of these microbend sensors, which is that of permitting a transfer of energy from a guided mode to another guided mode. An example of application utilizing such a characteristic is shown in FIG. 5. The fibre 2 is of bimodal type and the light source 20 is provided to emit, in FIG. 2, two luminous signals of differing modes or of differing polarizations. These two signals will advantageously be modulated at medium frequency (for example at radio frequency).

The sensor 1 is of the type described previously, the period of the discontinuities of which is adapted to permit the transfer of energy from one of the transmitted modes to the other. The separating device 21 ensures the separation of the transmitted modes heading for the detector 22, via the fibre 24, and for the detector 23, via the fibre 25. The effect of a disturbance at the location of the sensor 1 may be detected either by the detector 22 or by the detector 23, or indeed, by a comparison of the signals supplied by the two detectors 22 and 23.

What is claimed is:

1. A fiber-optic sensor for producing microbends in an optical fiber in response to variation of an environmental parameter, said optical fiber being embedded in a sheath made of a first material, said sheath being coated with a layer of a second material wherein said layer exhibits two lines of surface discontinuities according to a longitudinal direction of the fiber, said discontinuities being periodically distributed on each line at a distance d from each other and said lines being symmetrical according to the rotation axis of the fiber, but shifted on both sides of the rotation axis of the fiber whereby said first and second materials react in response to said environmental parameter in such a manner that a variation of said environmental parameter produces microbends of the same periodicity d as that of said discontinuities.

2. Sensor according to claim 1, wherein said sensor is sensitive to a variation of temperature, and wherein said first and second materials exhibit differing coefficients of thermal expansion.

3. Sensor according to claim 2, wherein said first material is made of a plastic material, and said second material made of a metal.

4. Sensor according to claim 1, wherein said second material is made of a metal, and said discontinuities are obtained by mechanical attack of said metal.

5. Sensor according to claim 1, wherein said second material is made of a metal, and said discontinuities are obtained by chemical attack of said metal.

6. Sensor according to claim 1, wherein said sensor is sensitive to humidity, and wherein said first and second materials exhibit differing coefficients of adsorption of moisture.

7. Sensor according to claim 1, wherein said sensor is sensitive to pressure, and wherein said first and second materials exhibit differing rigidities.

8. Sensor according to claim 1, wherein said optical fiber is a monomode fiber.

9. Sensor according to claim 1, wherein said optical fiber is a multimode fiber.

10. Sensor according to claim 1, wherein said optical fiber is a bimode fiber.

11. Sensor according to claim 1, wherein said periodicity of said discontinuities is such that the microbends produced in response to said variation of said environmental parameter involve a transfer of energy from at least one mode guided by said fiber to at least one mode radiated outside said fiber.

12. Sensor according to claim 1, wherein said periodicity of said discontinuation is such that the microbends produced in response to said variation of said environmental parameter involve a transfer of energy from at least one mode guided by said fiber to at least one other mode guided by said fiber.

13. A fiber-optic sensor as claimed in claim 1, wherein said periodic discontinuities are shifted a half-period d/2 on each side of the rotation axis of the fiber.

14. A fiber-optical sensor for producing microbends in an optical fiber in response to a variation of an environmental parameter, wherein said optical fiber is embedded in a sheath made of a first material, said sheath being coated with a layer of a second material having periodic discontinuities in a longitudinal direction of the fiber optical sensor, said discontinuities being disposed asymmetrically with respect to a plane containing the fiber axis, said first and second materials reacting in response to a variation in said environmental parameter to produce microbends of the same periodicity as that of said discontinuities.

15. A sensor according to claim 14, wherein said sensor is sensitive to a variation of temperature, and wherein said first and second materials exhibit differing coefficients of thermal expansion.

16. A sensor according to claim 15, wherein said first material is made of a plastic material, and said second material made of a metal.

17. A sensor according to claim 14, wherein said sensor is sensitive to humidity, and wherein said first and second materials exhibit differing coefficients of absorption of moisture.

18. A sensor according to claim 14, wherein said sensor is sensitive to pressure, and wherein said first and second materials exhibit differing rigidities.

19. A sensor according to claim 14, wherein said optical fiber is a monomode fiber.

20. A sensor according to claim 14, wherein said optical fiber is a multimode fiber.

21. A sensor according to claim 14, wherein said optical fiber is a bimode fiber.

22. A sensor according to claim 14, wherein said periodicity of said discontinuities is such that the microbends produced in response to said variation of said environmental parameter involve a transfer of energy from at least one mode guided by said fiber to at least one mode radiated outside said fiber.

23. A sensor according to claim 14, wherein said periodicity of said discontinuities is such that the microbends produced in response to said variation of said environmental parameter involve a transfer of energy from at least one mode guided by said fiber to at least one other mode guided by said fiber.

* * * * *